May 22, 1934.  C. E. BENNETT  1,959,339
ELECTRIC POWER CABLE
Filed Dec. 21, 1932
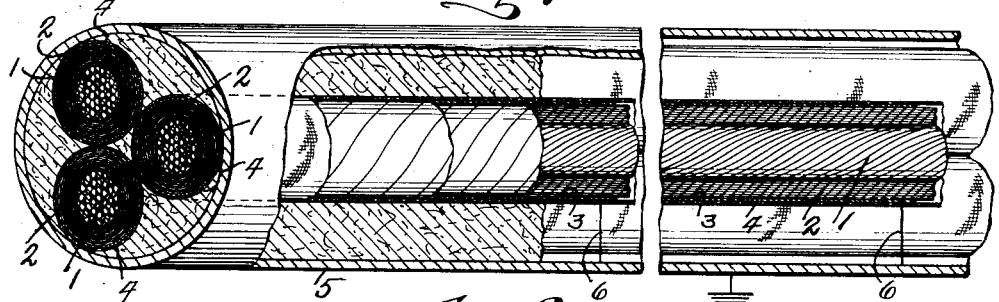
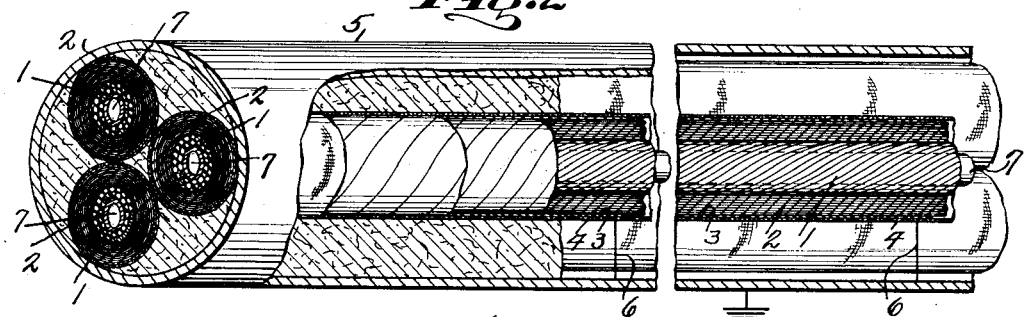
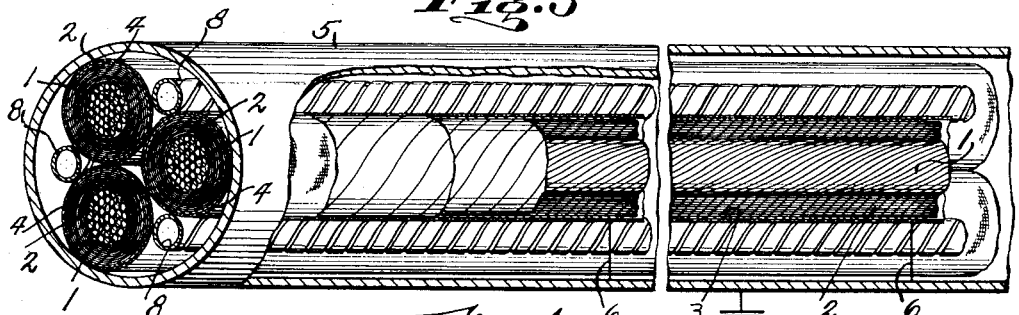
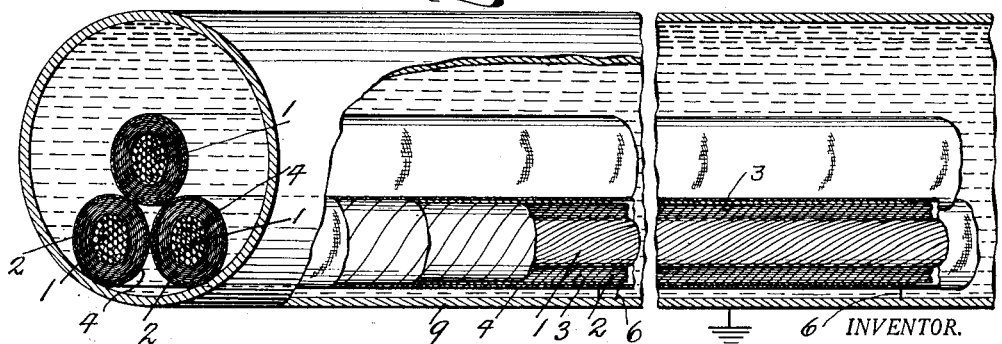
INVENTOR.
Charles E. Bennett.
BY
Kiddle, Margeson and Hornidge
ATTORNEYS.

Patented May 22, 1934

1,959,339

UNITED STATES PATENT OFFICE 1,959,339

ELECTRIC POWER CABLE

Charles E. Bennett, Hawthorne, N. J., assignor to The Okonite-Callender Cable Company, Incorporated, Paterson, N. J., a corporation of New Jersey Application December 21, 1932, Serial No. 648,162

6 Claims. (Cl. 173—266)

This invention relates to an improvement in electric power cables and has for one of its objects the provision of a construction whereby sheath losses are eliminated and the carrying capacity of the cable increased.

The invention is applicable to single as well as to multi-conductor cables of the solid type, of the hollow core type, of the oil filled type such as those employing channels in the filler spaces of the cable and to cables of the type disclosed in my copending application Serial No. 553,714, filed July 29, 1931.

In electric power cables it is customary to employ a metallic tape about the insulation of the cable, the lead sheath of the cable being applied directly over this tape. It is well known and recognized in the electric power cable industry that electromagnetic induction in this binding tape causes a potential to be built up along the tape. For example, approximately five volts per 100 amperes per 100 feet represents a normal condition in most cables. If the induced potential caused by this current flow is closed at two or more parts of this longitudinal section the induced potential will be zero but the current flow will be maximum until limited by the actual resistance of the metallic tape. This causes a current flow which represents an I² R loss in watts, and an equivalent heating which added to the heating of the insulation and the thermal heat in the cable reduces the total carrying capacity of the cable.

Briefly my invention provides for applying a metal tape over the paper or other insulation of the cable in discontinuous lengths or sections, canvas or canvas and paper tape or other insulation being applied over this metal tape, each length or section of tape being grounded at one point only to the grounded sheath or to the pipe of the cable.

By insulating the conducting metal tape from the lead sheath or from the pipe of the cable each tape length or section is grounded at one point only, it being understood of course that each tape length or section may be grounded at either end, midway of its ends. While by grounding at one point there will be a potential rise, this can be readily insulated and a potential carried of several hundred volts without any operating difficulty. It will be apparent, therefore, that electrostatic shielding is accomplished but the losses in the shielding tape are eliminated thereby decreasing the total temperature and increasing the carrying capacity of the cable.

It is well known that sheath losses in high voltage cables add very materially to the heating of the cable and represent quite an appreciable sum in total energy loss. The several lengths of metal tape may be terminated wherever it may be found convenient. I would suggest, for example, terminating at the various joints or sections of the cable where joining is done.

In the drawing accompanying this application I have shown several embodiments of my invention as applied to multi-conductor cables although as pointed out my invention is applicable as well to single conductor cables.

Fig. 1 is a part sectional elevational view of a multi-conductor cable of the solid core type in which my invention has been incorporated;

Fig. 2 is a similar view of a hollow core cable;

Fig. 3 is a similar view of a three conductor oil filled paper insulated cable employing channels for oil in the filler spaces of the structure; and Fig. 4 is a similar view of a cable of the type disclosed in my copending application Serial No. 553,714, and to which my invention has been applied.

Referring to the drawing in detail and first of all to Fig. 1 which as above mentioned illustrates a cable of the three conductor solid core type. The three conductors of this cable are designated 1 and as illustrated are of the solid stranded type, each conductor being insulated by paper insulating envelope 2 impregnated, as is customary, with oil or other fluid insulating material.

Immediately surrounding the paper or other insulating envelope 2 I apply a discontinuous metallic tape 3 or electrostatic shield. Over this tape is an insulation of canvas or canvas and paper tape or other suitable material designated 4.

On the exterior of the whole structure is applied the usual lead sheath 5.

Each metal tape or electrostatic shield 3 as I have indicated at 6 is grounded to the lead sheath 5 either at one end or intermediate its ends. I have made no attempt to limit myself as to the location of the terminals of the tape or shield sections inasmuch as the lengths or sections of the tape may be terminated at any convenient place along the length of a cable under construction. In practice it would probably be preferable to terminate the tape lengths or sections at the joints in the cable.

The foregoing, therefore, provides a cable structure in which sheath losses are eliminated by providing a metallic covering or electrostatic shield in discontinuous lengths grounded at one point only to the sheath of the cable immediately about the insulation of each conductor of the cable, this metallic covering being insulated from the grounded lead sheath of the cable except at the one point where the two, i. e. the metallic covering and sheath, are connected together for grounding purposes.

In Fig. 2 I show an embodiment of my invention as applied to a cable of the multi-conductor type similar to the cable of Fig. 1 except that each conductor is provided with a hollow core 7.

In Fig. 3 I show my invention applied to a cable of the multi-conductor solid core type, the same as the cable of Fig. 1 except for the oil channels 8.

In Fig. 4 I show a three conductor cable of the solid core type such as disclosed in my copending application Serial No. 553,714 to which the present invention is applied. In this case the sections of the metal tape or electrostatic shield 3 are grounded to the pipe 9 into which the conductors of the cable are drawn, this pipe in accordance with my copending application referred to being maintained filled with oil under pressure.

It is to be understood that changes may be made in the details of construction above described within the purview of my invention.

What I claim is:—

1. An electric power cable for the underground transmission of electrical energy comprising in combination an insulated conductor, an electrostatic shield surrounding the insulation, a grounded metallic enclosure for the cable, insulation between said shield and said enclosure, and a single ground connection for said shield.

2. An electric power cable for the underground transmission of electrical energy comprising in combination a plurality of cable conductors, insulation for each conductor, an electrostatic shield surrounding the insulation of each conductor, a grounded metal enclosure for said insulated conductors, insulation between said shields and said enclosure, and a single ground connection for the electrostatic shields.

3. An electric power cable for the underground transmission of electrical energy, comprising in combination an insulated conductor, an electrostatic shield comprising an electrical conductive tape in discontinuous lengths surrounding the insulation of the conductor, a grounded metal enclosure for the cable, insulation for insulating said tape lengths from said enclosure, and a single ground connection to said enclosure for each tape length.

4. An electric power cable for the underground transmission of electrical energy, comprising in combination a plurality of cable conductors, insulation for each conductor, an electrostatic shield comprising an electrical conductive tape in discontinuous lengths surrounding the insulation of each conductor, a grounded metal enclosure for said insulated conductors, insulation for insulating said tapes from said enclosure, and a single ground connection to said enclosure for each tape length.

5. An electric power cable for the underground transmission of electrical energy, comprising in combination an insulated conductor, an electrostatic shield surrounding the insulation, an enclosing pipe filled with oil under pressure providing a reservoir filled with oil surrounding the said conductor, its insulation and said shield, and a single ground connection for said shield.

6. An electric power cable for the underground transmission of electrical energy comprising in combination a plurality of independently insulated cable conductors, an electrostatic shield surrounding the insulation of each conductor, insulation about said shields, a grounded pipe filled with oil under pressure for receiving said conductors, and a single ground connection for each shield.

CHARLES E. BENNETT.